A. STUBER.
LIQUID MEASURING AND REGISTERING DEVICE.
APPLICATION FILED JAN. 26, 1917.
1,370,068. Patented Mar. 1, 1921.
2 SHEETS—SHEET 1.
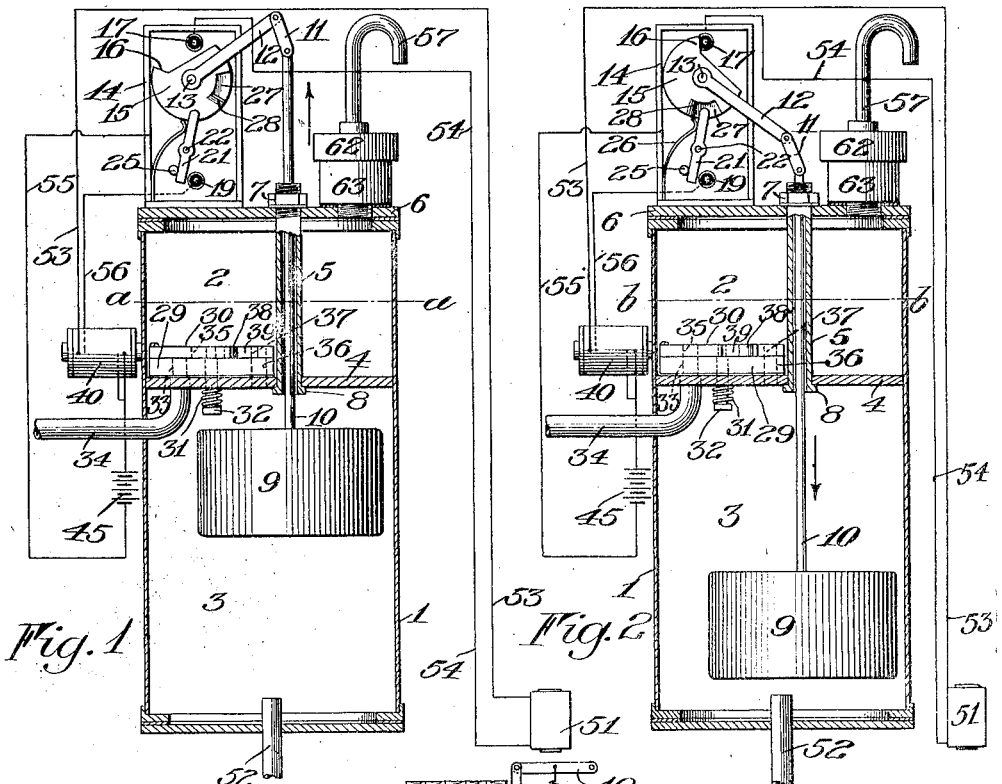
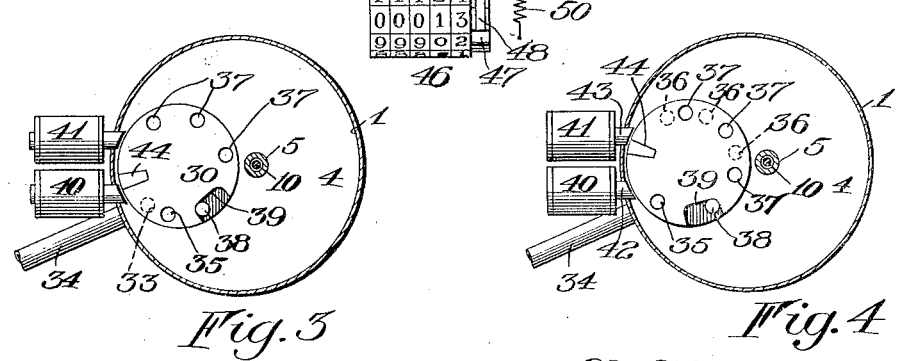
Witnesses:
Francis Jerdone Jr.
George D. Powell
INVENTOR
Adolph Stuber
BY
his ATTORNEYS

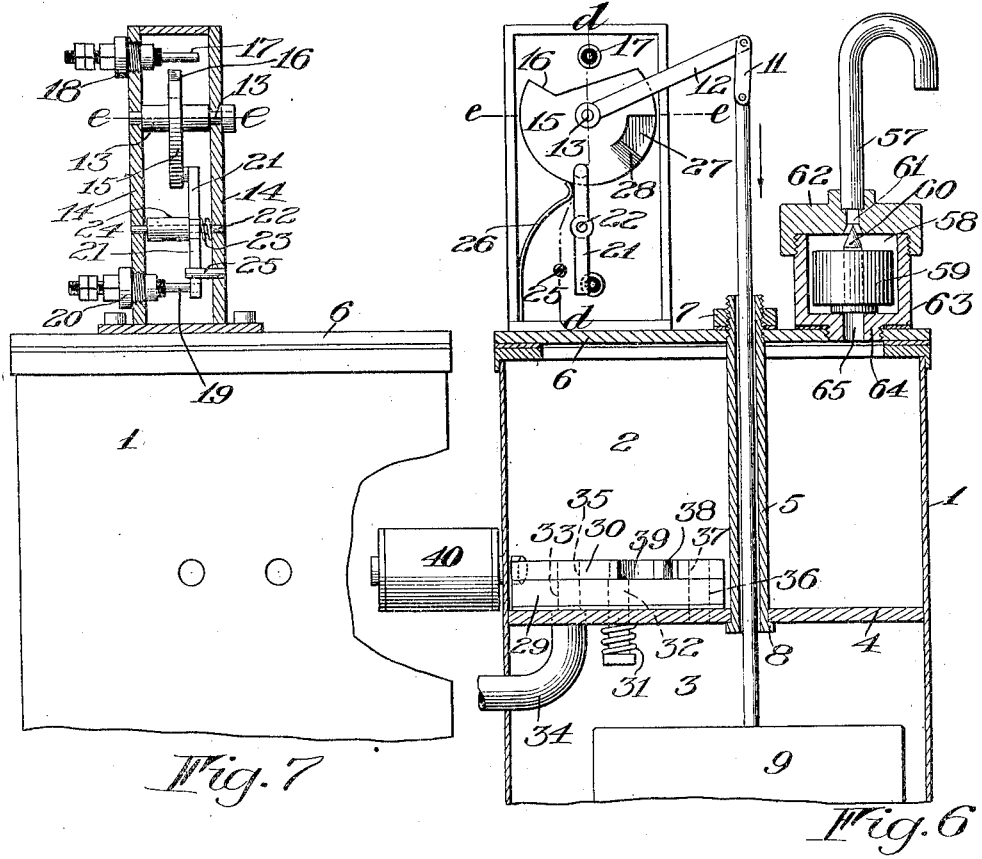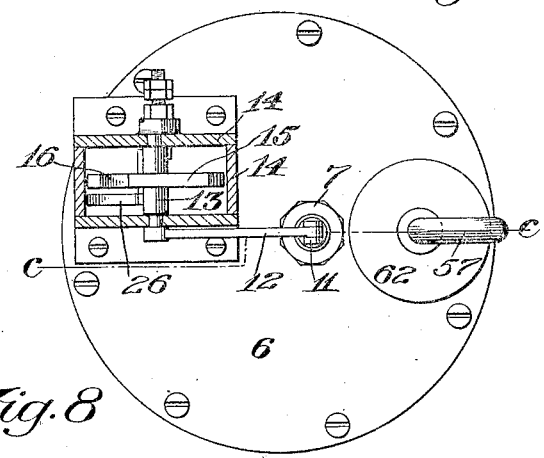

UNITED STATES PATENT OFFICE.

ADOLPH STUBER, OF ROCHESTER, NEW YORK.

LIQUID MEASURING AND REGISTERING DEVICE.

1,370,068. Specification of Letters Patent. Patented Mar. 1, 1921.

Application filed January 26, 1917. Serial No. 144,599.

*To all whom it may concern:*

Be it known that I, ADOLPH STUBER, of Rochester, in the county of Monroe and State of New York, have invented certain new and useful Improvements in Liquid Measuring and Registering Devices; and I do hereby declare the following to be a full, clear, and exact description of the same, reference being had to the accompanying drawings, forming a part of this specification, and to the reference characters marked thereon.

My invention relates to a liquid measuring and registering device and has for its object to provide means for measuring and registering liquid fuel fed from a liquid supply source to a liquid consuming element. A further object of the invention is to provide a registering mechanism operatively connected with a measuring device, the latter being provided with inlet and outlet ports communicating with a float chamber and arranged to be alternately opened and closed by means, the operation of which is effected by movement of a float in said chamber. A further object of the invention is to provide a liquid measuring device having an electrically operated liquid controlling member arranged to be actuated upon the operation of a switch controlled by the movement of a float operated by liquid fed through said controlling device from a measuring receptacle.

A still further object of the invention is to provide a liquid measuring device controlled by the operation of a movable member between a liquid measuring receptacle communicating with a liquid supply source and a container communicating with a liquid consuming element, said member being electrically operated in one direction to cut off the source of supply leading to the measuring receptacle and to open the passageway leading therefrom to the container and actuated in an opposite direction to close said passageway and to establish communication between the receptacle and supply source. To these and other ends the invention consists in certain improvements and combinations of parts, all as will be hereinafter more fully described, the novel features being pointed out in the claims at the end of the specification.

In the drawings:

Figure 1 is a sectional elevation illustrating one embodiment of the invention;

Fig. 2 is a similar view with the float shown in substantially its lowermost position;

Fig. 3 is a sectional view taken on line *a—a* of Fig. 1;

Fig. 4 is a sectional view taken on line *b—b* of Fig. 2;

Fig. 5 is an enlarged detail view of the switch segment shown in Fig. 2, looking at one edge thereof;

Fig. 6 is an enlarged sectional elevation taken on line *c—c* of Fig. 8;

Fig. 7 is a sectional elevation taken on line *d—d* of Fig. 6, and

Fig. 8 is a horizontal sectional view taken on line *e—e* of Fig. 7.

Similar reference characters throughout the several views indicate the same parts.

The present invention embodies a liquid fuel measuring and registering device which is intended especially for use on automobiles and other motor driven vehicles where it is desired to readily determine the amount of fuel consumed by the motors and the amount remaining in the supply tank at any given time.

It will be understood that the invention is also readily applicable to stationary liquid fuel consuming engines, and that it may be used for measuring and registering predetermined quantities of various kinds of liquids other than liquid fuels.

The invention comprises broadly an electrically operated valve controlled by a switch actuated by a float, the valve being interposed between a measuring receptacle and a float chamber and operable in one direction to open a passageway or plurality of passageways leading from the former to the latter and arranged to close the passageway leading from the supply source to said measuring receptacle, but when actuated in an opposite direction to open the last mentioned passageway and close the first. A registering mechanism is operatively connected with the measuring device and will be actuated to register the units of fuel passed from the measuring receptacle to the float chamber, each unit of the liquid being discharged from the float chamber before another is admitted thereto. The registering mechanism is preferably electrically operated, the circuit in which the same is placed being normally open, said circuit being closed at the proper time preferably by the switch which controls the operation of the valve.

Referring to the drawings by numerals, 1 represents a tank or container divided preferably into upper and lower compartments 2 and 3, the latter constituting the float chamber and the former the measuring chamber of the device. These chambers are divided by the partition 4 through which is extended a sleeve 5 which projects through the upper head 6 of the container to receive the securing nut 7. A flange 8 is formed upon the lower end of the sleeve in position to engage the bottom of the partition to form a liquid tight joint between the upper and lower chambers. A float 9 is mounted in the lower chamber and is provided with a rod 10 which is extended through the sleeve 5, a link 11 being pivotally connected with the upper end of the rod as shown in Figs. 1 and 2. The link 11 is also pivotally connected with a lever 12 which is rigidly connected with a shaft 13, the opposite ends of which are journaled in the side walls of the switch box 14 mounted upon the head 6 of the measuring tank, said lever arm being preferably positioned outside of the switch box as shown in Figs. 7 and 8. Mounted upon the shaft 13 is a segmental contact plate 15 provided with a shoulder 16 which is arranged when the float reaches its lowermost position to move into engagement with the upper contact pin 17 insulated from and carried by the screw plug 18 extending through one of the walls of the switch box as shown in Fig. 7. A second insulated contact pin or post 19 is projected into the switch box through the screw plug 20 as shown, and lies in the path of the lower arm of a contact lever 21 rotatably mounted upon a shaft 22, the opposite ends of which are supported by the walls of the switch box. The upper end of the contact lever 21 is held in frictional engagement with the front face of the contact plate 15 by means of a spring 23 on the shaft 22, the spring being interposed between the lever and the front wall of the switch box as shown in Fig. 7. A thimble 24 is loosely mounted upon the shaft 22 between the rear wall of the switch box and the lever 21 and serves to limit the movement of the lever in the direction of the contact plate 15.

A stop pin 25 is positioned at the rear of the lower arm of the contact lever 21 to limit its movement in one direction as shown in Figs. 1 and 2, while a spring 26 normally holds said lever out of engagement with the contact member 19. However, movement of the float downwardly from the position shown in Fig. 1 will, through the frictional contact of the lever with the contact plate 15, cause said lever to be thrown into engagement with the contact member 19 where it will remain until the float descends substantially to its lowermost position as shown in Fig. 2, at which time the upper end of the lever 21 will move into the recess 27 and hence out of contact with the plate 15, as said recess is of a sufficient depth to clear the lever when the same is in this position. It will be understood that said lever is limited in its sliding movement upon the shaft 22 under the action of the spring 23 toward the contact plate by the striking of the thimble 24 against the rear wall of the switch box 14. When the float reaches its extreme lowermost position the shoulder 16 on the plate 15 will move into engagement with the contact member 17 and as the float rises the segmental plate 15 will be moved back to the position shown in Fig. 1, during which time the upper end of the lever 21 will move out of the recess 27 over the incline 28 and the lower end will be held out of engagement with the contact pin 19 until the direction of movement of the segmental plate is reversed by downward movement of the arm 12 when actuated by the float 9. Thus it will be seen that the upper switch contacts are closed when the float reaches its lowermost position and that the lower switch contacts are closed when the float begins to descend from its uppermost position.

I will now describe the construction and operation of the electrically actuated valve which opens and closes the passageways admitting the liquid to the measuring chamber 2 and discharging it therefrom into the float chamber 3. This valve comprises a lower stationary disk or plate 29 seated upon the partition 4 between the upper and lower chambers 2 and 3 respectively. Upon the lower plate 29 is rotatably mounted a valve plate 30 which is held in frictional contact with the lower plate by means of a spring 31, the upper end of which is seated upon the bottom of the partition 4, while the lower end is seated upon the head of the bolt 32 which passes through and is journaled in the lower valve plate, said bolt being connected with the upper valve plate whereby upon rotation of the same the bolt will rotate also. The lower plate is provided with an aperture or port 33 registering with an aperture in the partition wall 4 and communicating with said last mentioned aperture is a pipe 34 extending through the wall of the float chamber 3, said pipe being adapted to communicate with a liquid supply source such as the fuel supply tank of an automobile (not shown).

The rotary valve plate 30 is provided with an inlet aperture 35 which when the plate is in the position shown in Fig. 4, will register with the aperture 33 in the lower valve plate 29 through which the liquid is fed or forced into the measuring chamber from the pipe 34. The bottom plate 29 is also provided preferably with a series of outlet apertures or openings 36 which are closed by the upper valve plate when the aperture 35 registers with the aperture 33 and which communicate with corresponding openings in the partition wall 4. The upper valve plate is also provided with a series of apertures 37 which register with the apertures 36 when the aperture 33 is closed or when said upper plate is in the position shown in Fig. 3. Thus it will be seen that when the inlet aperture to the measuring chamber 2 is open, the outlet apertures leading to the float chamber will be closed and vice versa. Movement of the rotary valve plate 30 in opposite directions is limited by the stop pin 38 projecting upwardly from the valve plate 29 in the recess 39 formed in the valve plate 30, whereby the upper and lower inlet and outlet openings in said valve plates are made to register with each other at the proper time.

Rotation of the valve plate 30 in opposite directions is effected by the magnets 40 and 41 which are provided with spaced magnetic cores 42 and 43 respectively, projected preferably into the measuring chamber 2 in proximity to the outer periphery of said rotary valve plate which is provided with an insert or bar of magnetic material indicated at 44, whereby the cores 42 and 43 upon being alternately energized will cause rotation of the valve plate by attracting said bar of magnetic material.

The switch already described will alternately cause the energization of said magnets by opening and closing certain circuits in which the magnets are placed, current for which is supplied by the battery 45.

Any suitable registering mechanism for registering the units of liquid discharged by the measuring device may be provided, such as the counter 46 having the ratchet wheel 47 operated by the pawl 48 pivotally connected with the armature 49, which is actuated in one direction by the spring 50 and in an opposite direction by the magnet 51. The magnet 51 is preferably included in the circuit containing the magnets 40 and 41 and is energized whenever the shoulder 16 of the switch plate 15 is brought into engagement with the contact member 17 which is done when the float 9 reaches its lowermost position when the unit of liquid previously discharged into the float chamber has been fed through the discharge pipe 52 to any liquid holding or liquid consuming element such as the engine of an automobile. With the shoulder 16 in engagement with the contact member 17 current will flow from the battery 45 through magnet 40, conductor 53, magnet 51, conductor 54, contact 17, segment 15, casing 14 and conductor 55 back to battery, at which time the valve plate 30 will be rotated from the position shown in Fig. 4 to that shown in Fig. 3 to allow the unit of fuel in the measuring chamber to be discharged into the float chamber which causes the elevation of the float to the position shown in Fig. 1. Downward movement of the float from this position will effect engagement of the lower arm of the contact lever 21 with the contact member 19 as previously explained and when this is done current will flow from battery 45 through magnet 41, conductor 56, contact member 19, lever 21, segment 15, switch box casing 14 and conductor 55 back to battery 45 thereby energizing core 43 and attracting the bar of magnetic material 44 to cause the rotation of the valve plate 30 from the position shown in Fig. 3 to that shown in Fig. 4, which will cut off the float chamber and open the passageway leading from the supply pipe 34 to the measuring chamber. Liquid in the measuring chamber 2 and float chamber 3 is preferably held under atmospheric pressure, in the case of the latter by air admitted through the sleeve 5 around the float rod 10 and in the case of the former, by air admitted through the pipe 57 into the float chamber 58 and thence into said measuring chamber.

In order to prevent the overflow of the measuring chamber through the pipe 57 I provide in the chamber 58 a small float 59 carrying a valve 60, which when the measuring chamber is filled, will be elevated by the float to close the passageway 61 through the head 62 of the cylinder or casing 63 forming the float chamber 58. The casing 63 is provided with a threaded extension 64 which is screwed into the head 6 of the container 1, said extension having an opening therethrough connecting the chambers 2 and 58 around the float rod 65 which serves to hold the float in position to guide the valve thereon into proper position upon its seat.

I claim as my invention:

1. A liquid measuring device comprising a measuring chamber, a float chamber having a float therein provided with a rod operable through the measuring chamber, a valve for admitting liquid to the measuring chamber and for discharging said liquid into the float chamber, a switch having contacts arranged to be closed by movement of the rod in opposite directions, and an electric circuit including a pair of magnets, one of which is arranged to operate said valve in one direction and the other in an opposite direction, said circuit being opened and closed by the switch to alternately energize said magnets.

2. A fluid measuring and registering device comprising a fluid chamber, a second chamber beneath the first containing a float having a rod extending through the fluid chamber, a member movable in opposite directions through which fluid is adapted to pass to the first mentioned chamber, when said member is in one position, and from the first to the second mentioned chamber when the member is in another position, a registering mechanism and electro-mechanical means controlled by the rod arranged to operate said member and said registering mechanism.

3. A liquid measuring device comprising a measuring chamber, a float chamber provided with a float, a valve interposed between said chambers comprising a plate forming a seat and having a plurality of outlet apertures therethrough communicating with the float chamber and a movable plate upon the seat having a plurality of apertures arranged to be moved into and out of registering relation with the apertures of the seat, said plates having inlet apertures leading to the measuring chamber which are adapted to register after the first mentioned apertures are moved out of registry and electro-mechanical devices for actuating said movable plate, the operation of said devices being effected by movement of the float.

4. A liquid measuring device comprising a measuring chamber, a float chamber having a float therein, a valve interposed between said chambers comprising a plate forming a seat having a plurality of outlet apertures therethrough communicating with the float chamber and a movable plate upon the seat having a number of apertures arranged to be moved into and out of registering relation with the apertures of the seat, said plates having inlet apertures leading to the measuring chamber adapted to register when the first mentioned apertures are out of registry, a normally open electric circuit containing a pair of electromagnets, said circuit having contacts arranged to be opened and closed by movement of the float to alternately energize said magnets for the purpose of actuating said movable plate in opposite directions whereby liquid is first admitted to the measuring chamber and then discharged into the float chamber.

5. A liquid measuring and registering device comprising a measuring chamber, a float chamber having a float therein, a valve interposed between said chambers comprising a plate forming a seat having an outlet aperture therethrough communicating with the float chamber and a movable plate upon the seat having an aperture arranged to be moved into and out of registry with the aperture of the seat, said plates having inlet apertures leading to the measuring chamber adapted to register when the first mentioned apertures are out of registry, a registering device and electro-mechanical mechanisms for effecting the operation of said movable plate and said registering device, the actuation of said mechanisms being controlled by the movement of the float.

6. A liquid measuring device comprising a measuring chamber, a float chamber having a float therein, a valve interposed between said chambers comprising a plate forming a seat having an outlet aperture therethrough communicating with the float chamber and a movable plate upon the seat having an aperture arranged to be moved into and out of registry with the aperture of the seat, said plates having inlet apertures leading to the measuring chamber adapted to register when the first mentioned apertures are out of registry, a normally open electric circuit containing a plurality of electromagnets, said circuit having contacts arranged to be opened and closed by movement of the float to cause energization of the several magnets for the purpose of actuating said movable plate from one position to another.

7. A liquid measuring and registering device comprising a measuring chamber, a float chamber connected therewith and provided with a float, a liquid supply passageway leading to the measuring chamber and an independent discharge passageway leading therefrom to the float chamber, means movable to alternately open and close said passages, a registering mechanism and means controlled by the float for actuating said first mentioned means and said registering mechanism.

8. A liquid measuring device comprising a measuring chamber, a float chamber connected therewith and provided with a float, a liquid supply passageway leading to the measuring chamber and an independent discharge passageway leading therefrom to the float chamber, means movable to alternately open and close said passageways simultaneously, and means controlled by the float for actuating said last mentioned means.

9. A liquid measuring device comprising a measuring chamber having independent liquid inlet and outlet passageways for admitting and discharging liquid to and from said chamber, an oscillatory member controlling the opening or closing of said passageways, a fluid registering mechanism, means for periodically actuating said oscillatory member, means for actuating said fluid registering mechanism and means actuated by the measured liquid for controlling the operation of said first and second mentioned means.

10. A fluid measuring and registering device comprising a fluid chamber, a second chamber connected with the first and containing a float, a member movable in opposite directions through which fluid is adapted to pass to the first mentioned chamber when said member is in one position and from the first to the second mentioned chamber when the member is in another position, a registering mechanism and means controlled by the float and arranged to operate said member and said registering mechanism.

11. A liquid measuring device comprising a measuring chamber having independent liquid inlet and outlet passageways for admitting and discharging liquid to and from said chamber, a pivoted plate for alternately opening and closing said passageways and means for periodically moving said plate upon its pivot.

ADOLPH STUBER.